United States Patent
Seki et al.

(10) Patent No.: US 8,471,809 B2
(45) Date of Patent: Jun. 25, 2013

(54) OPERATION BODY, INFORMATION-INPUT DEVICE, AND INFORMATION TERMINAL DEVICE

(75) Inventors: Fujio Seki, Shinagawa (JP); Hiroyuki Murano, Shinagawa (JP); Heiichi Sugino, Shinagawa (JP); Takeshi Kasai, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1068 days.

(21) Appl. No.: 11/826,347

(22) Filed: Jul. 13, 2007

(65) Prior Publication Data

US 2007/0262955 A1    Nov. 15, 2007

Related U.S. Application Data

(63) Continuation of application No. PCT/JP2005/014531, filed on Aug. 8, 2005.

(30) Foreign Application Priority Data

Jan. 14, 2005 (JP) .................................. 2005-008472

(51) Int. Cl.
*G09G 5/00* (2006.01)

(52) U.S. Cl.
USPC ........... 345/156; 345/166; 345/163; 345/169; 361/679.1; 361/679.18

(58) Field of Classification Search
USPC .. 345/156, 176, 204, 166, 163, 169; 361/686, 361/683, 679.18
See application file for complete search history.

(56) References Cited

U.S. PATENT DOCUMENTS

| 5,049,863 | A | * | 9/1991 | Oka .............................. 345/163 |
| 5,483,262 | A | * | 1/1996 | Izutani .......................... 345/179 |
| 5,757,616 | A | * | 5/1998 | May et al. ................ 361/679.57 |
| 6,626,686 | B1 | | 9/2003 | D'Souza et al. |

(Continued)

FOREIGN PATENT DOCUMENTS

| DE | 203 14713 | 1/2004 |
| JP | 07-261928 | 10/1995 |

(Continued)

OTHER PUBLICATIONS

Office Action mailed on Aug. 15, 2008 and issued in corresponding Chinese Patent Application No. 200580046580.7.

(Continued)

*Primary Examiner* — Lun-Yi Lao
*Assistant Examiner* — Shaheda Abdin
(74) *Attorney, Agent, or Firm* — Staas & Halsey LLP

(57) ABSTRACT

An operation body having a pointing function with respect to information includes a chassis having a reflection face, a circuit charging an inner second battery when receiving an electrical power from outside through a terminal exposed from the chassis, and a circuit transmitting switch information to outside cordlessly. On the other hand, an information-input device includes a chassis supporting a keyboard, and an optical system that transmits a light to an operation body operated on the chassis and receives a reflected light of the light. The chassis supporting the keyboard has a recess housing the operation body. The operation portion may be housed in the recess. The second battery is charged when the operation body is housed. And a light emitting of the optical system is stopped when the operation body is housed.

3 Claims, 16 Drawing Sheets

U.S. PATENT DOCUMENTS

| | | | |
|---|---|---|---|
| 6,784,870 B2 * | 8/2004 | Yin | 345/156 |
| 7,086,634 B1 * | 8/2006 | Kirchhoff | 248/286.1 |
| 2004/0075640 A1 * | 4/2004 | Liao | 345/156 |
| 2004/0133716 A1 * | 7/2004 | Lee | 710/72 |
| 2005/0015805 A1 * | 1/2005 | Iwamura | 725/79 |
| 2006/0082553 A1 | 4/2006 | Lin | |
| 2006/0152484 A1 | 7/2006 | Rolus Borgward | |

FOREIGN PATENT DOCUMENTS

| | | | |
|---|---|---|---|
| JP | 10-214154 | | 8/1998 |
| JP | 11-073277 | | 3/1999 |
| JP | 2001-236143 | | 8/2001 |
| JP | 2002-082741 | | 3/2002 |
| JP | 2002-318661 | | 10/2002 |
| JP | 2003-044215 | | 2/2003 |
| JP | 2003-199540 | | 7/2003 |
| JP | 2003-295972 | | 10/2003 |
| JP | 2004-199540 | | 7/2004 |
| JP | 2004199540 A * | | 7/2004 |
| JP | 3109842 | | 4/2005 |
| TW | I227849 | | 2/2002 |
| TW | M257483 | | 2/2005 |
| TW | M269511 | | 7/2005 |

OTHER PUBLICATIONS

International Search Report of International Application No. PCT/JP2005/014531, filed Aug. 8, 2005.
Office Action mailed on Sep. 19, 2008 in corresponding Taiwanese Patent Application No. 094128067.
Japanese Office Action dated Jul. 19, 2011 in Application No. 2006-552835.
English Abstract of DE20314713, Published Jan. 15, 2004.
Supplementary European Search Report in Application No. 05768878.0 dated Nov. 29, 2011.
"Family List" for German Reference No. 203 14 713 dated Jan. 5, 2012, Espacenet.
Patent Abstracts of Japan, Publication No. 07-261928, published Oct. 13, 1995.
Patent Abstracts of Japan, Publication No. 10-214154, published Aug. 11, 1998.
Patent Abstracts of Japan, Publication No. 11-073277, published Mar. 16, 1999.
Japanese Office Action mailed May 15, 2012 issued in corresponding Japanese Patent Application No. 2011-20740.

* cited by examiner

OPERATION BODY, INFORMATION-INPUT DEVICE, AND INFORMATION TERMINAL DEVICE

CROSS-REFERENCE TO RELATED APPLICATIONS

This is a continuing application, filed under 35 U.S.C. §111(a), of International Application PCT/JP2005/014531, filed Aug. 8, 2005, which claims foreign priority benefit of Japanese Patent Application 2005-008472, filed Jan. 14, 2005.

BACKGROUND OF THE INVENTION

1. Field of the Invention

This invention generally relates to a thin and cordless operation body having a pointing function, an information-input device capable of housing the operation body, and an information terminal device having the operation body and the information-input device.

2. Description of the Related Art

Recently, a pointing device is used as an information-input device of an information device such as a personal computer, the pointing device moving a pointer in a display, selecting information, and commanding. There are a variety of devices such as a track pad, a track ball, a mouse and so on, as the above-mentioned pointing device.

Japanese Patent Application Publication No. 2002-318661 (hereinafter referred to as Document 1) supposes one of the pointing devices. Document 1 discloses a pointing device having an information display, a sensor and a controller, the information display displaying information and a pointer for selecting the information, the sensor reading an optical image of a finger and detecting a movement of the finger, the controller moving the pointer according to the movement of the finger detected by the sensor. With this pointing device, it is possible to select necessary information when one finger moves the pointer displayed in the information display.

Among the pointing devices, it is possible to build the track pad or the track ball into a keyboard and is possible to restrain an increase of a height of the keyboard. However, the above-mentioned pointing device has a problem in usability that it takes a familiarity with the operation of the pointing device.

The pointing device disclosed in Document 1 has high operability when an operator holds a mobile terminal such as a cellular phone with one hand and operates the pointer. And it is possible to restrain an increase of a height of the pointing device. However, the pointing device has the same problem as the track pad and the track ball. The problem is that it takes a familiarity with the operation of the pointing device and the pointing device is not usable when operating a pointer displayed in a display of a laptop personal computer. And the pointing device disclosed in Document 1 reads an optical image of a fingertip and moves a pointer. However, it is possible that a focal point is out of focus depending the operation of an operator, and it may not be possible to pick up the movement of the fingertip completely.

On the other hand, the mouse is used in an information terminal device such as a personal computer, because the mouse has high operability and it is easy to operate the mouse.

Recently, an optical mouse is developed. The optical mouse has a light emitter and a light receiver in the body thereof, and moves a pointer along a moving direction of the mouse. As shown in FIG. 13, this optical mouse is a mouse 52 that has an optical sensor 52a composed of a light emitter and a light receiver, and is operated on a desk 53 or the like. The optical sensor 52a receives a reflection light shown at an arrow 54, detects a movement of the mouse 52, and reflects the movement to a pointer.

Further, a wireless mouse not coupled to an information terminal device such as a personal computer is developed. And operability is getting higher.

There is a console drawer 50 among information terminal devices using the above-mentioned mouse, the console drawer 50 being housed in a rack 51 that has a plurality of slide-out shelves and having an openable and closable display 55 similarly to a laptop personal computer, as shown in FIG. 14. The console drawer 50 has a keyboard 56 and the mouse 52, as shown in FIG. 15. The mouse 52 is operated in a space near the keyboard 56.

Here, the openable and closable display 55 generally has a liquid crystal. There is a possibility that the conventional mouse 52 gives damage to the liquid crystal of the display 55, when the display 55 is closed by mistake with the mouse 52 being placed near the keyboard 56 as shown in FIG. 16.

SUMMARY OF THE INVENTION

The present invention provides a thin operation body having high storability and high operability, an information-input device and an information terminal device that are capable of housing the operation body.

According to an aspect of the present invention, preferably, there is provided an operation body having a pointing function with respect to information, and including a chassis having a reflection face, a circuit charging an inner second battery when receiving an electrical power from outside through a terminal exposed from the chassis, and a circuit transmitting switch information to outside cordlessly.

This operation body has a same function as a mouse. That is, the operation body may move a pointer displayed in a display, select information displayed in the display, and command. The operation body itself does not have a light emitter and a light receiver for moving a pointer, being different from a conventional optical mouse. The operation body may have at least a circuit for transmitting switch information generated by a click operation to outside, a second battery for providing an electrical power to the circuit such as a lithium battery, and a circuit for charging the second battery. It is therefore possible to reduce the thickness of the operation body. There is a case where the operation body is referred to as a mouse in this specification, because an operation method of the operation body is partially in common with the conventional mouse.

The operation body may have a structure in which the chassis has a portion that engages with a lock member that is provided at an external device when the chassis is housed in the external device. With the structure, it is possible to house and hold the operation body in the external device stably.

The operation body may have a structure in which the circuit transmitting the switch information is an infrared radiation transmitter circuit. The infrared radiation transmitter circuit may select information pointed by a pointer in an external device such as a display and may command. In addition, the circuit for transmitting the switch information may be another circuit such as a communication circuit using an electrical wave.

According to another aspect of the present invention, preferably, there is provided an information-input device including a chassis supporting a keyboard, and an optical system that transmits a light to an operation body operated on the chassis and receives a reflected light of the light. The chassis supporting the keyboard has a recess housing the operation body.

The information-input device may be used with the operation body as claimed in claim 1. That is, the information-input device may emit a light to a reflection face of the operation body, receive a reflected light of the light, and move a pointer. And it is possible to house the input-information device in a rack with the operation body compactly, if the operation body can be housed in a recess. In this case, the information-input device corresponds to an external device with respect to the operation body.

The information-input device may have a structure in which the chassis has a lock mechanism locking the operation body housed in the recess. The information-input device may further have an emission stop circuit that stops emitting a light of the optical system when the operation body is housed in the recess. With the emission stop circuit, it is possible to reduce power consumption when the information-input device is not in use.

The information-input device may further have a circuit charging a second battery in the operation body that is to be housed in the recess. With the structure in which the operation body is charged with the operation body being housed in the recess, the operation body being charged is not obstructive. And the operation body may be charged in order to prepare for next use.

The information-input device may further have a charging-state displaying mechanism displaying that the second battery is being charged.

The information-input device may further have a circuit cordlessly communicating with the operation body. With the circuit, it is possible to receive the switch information of the operation body at the information-input device.

It is preferable that the information-input device has a structure in which the chassis has an operation portion having a pointing function with respect to information. With the operation portion, it is possible to operate the information-input device, even if the charging of the operation body is not completed and the operation body is unusable.

Generally, the information-input device displays information and a pointer in a display, operates the pointer with the operation body with respect to the indication, selects the information, and commands. The information-input device may have a display. In this case, it is preferable that the information-input device further has a structure in which a display is capable of lapping on the chassis, from a housing viewpoint. Even if the information-input device has a display being capable of lapping with the chassis, the operation body is not obstructive when the display laps with the chassis, because the operation body can be housed in the recess formed in the chassis.

There is a console drawer that is housed in a rack having a plurality of slide-out shelves and is operated similarly to a laptop personal computer, as the information-input device. In a case where the information-input device is used as the console drawer, the information-input device may communicate with an external server.

According to another aspect of the present invention, preferably, there is provided an information terminal device including an operation body and an information-input device. The operation body has a pointing function with respect to information, and has a chassis having a reflection face, a circuit charging an inner second battery when receiving an electrical power from outside through a terminal exposed from the chassis, and a circuit transmitting switch information to outside cordlessly. The information-input device has a chassis supporting a keyboard, and an optical system transmitting a light to an operation body operated on the chassis and receiving a reflected light of the light. The chassis has a recess housing the operation body. That is, it is possible to use the operation body and the information-input device together. The input terminal device has both of them in view of the situation.

BRIEF DESCRIPTION OF THE DRAWINGS

Preferred embodiments of the present invention will be described in detail with reference to the following drawings, wherein:

FIG. 3A illustrates a back view; FIG. 3B illustrates a top view; FIG. 3C illustrates a front view; and FIG. 3D illustrates a bottom view of the mouse;

DESCRIPTION OF THE PREFERRED EMBODIMENTS

A description will now be given of the best mode for carrying out the invention with reference to the accompanying drawings.

First Embodiment

Figure 1:
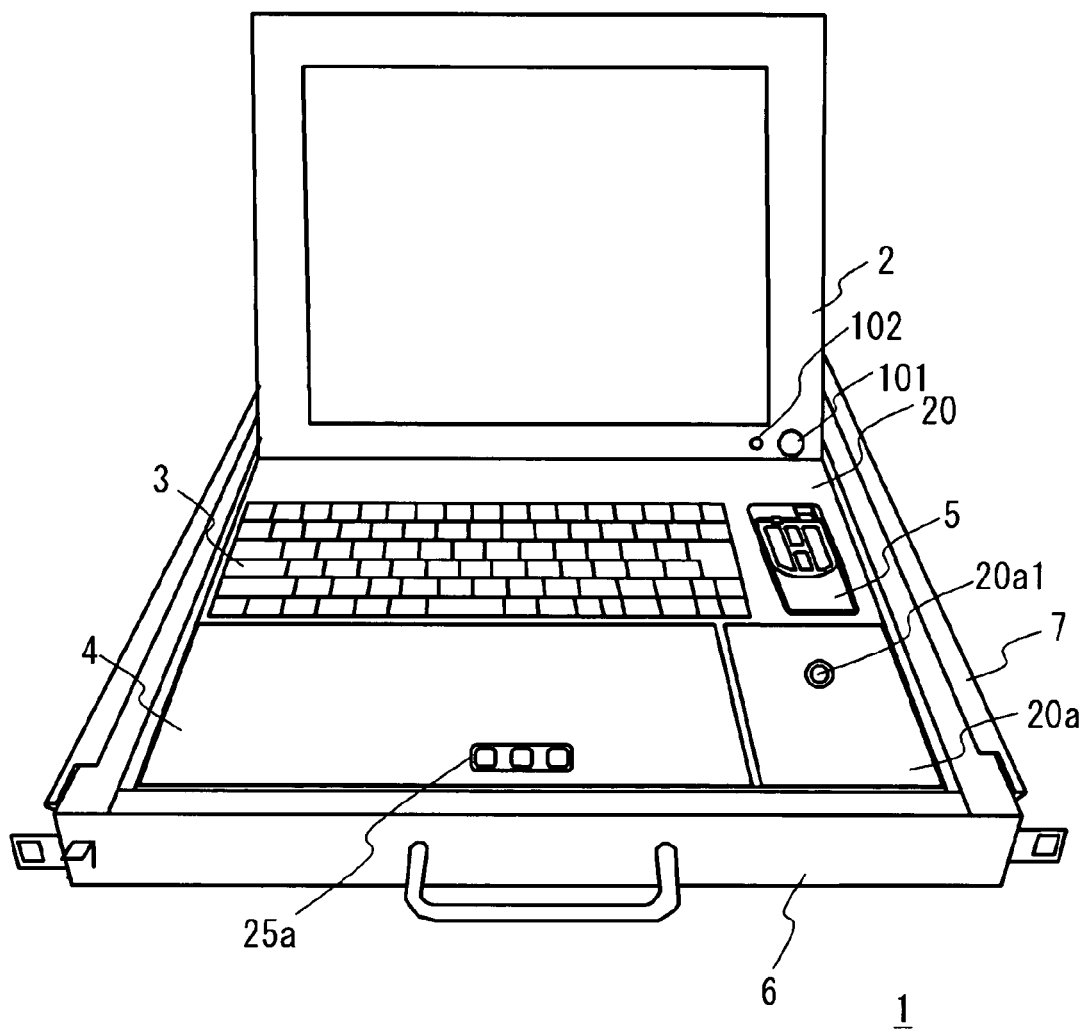
FIG. 1 illustrates a perspective view of a console drawer in accordance with an embodiment, viewed from front side.
Figure 2:
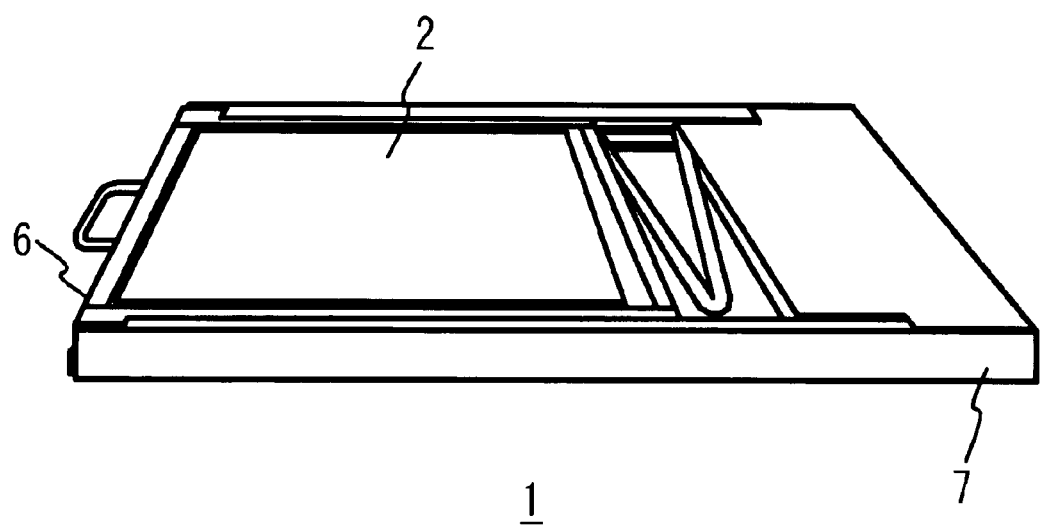
FIG. 2 illustrates a perspective view of a console drawer in accordance with an embodiment with the display being down, viewed from side.

FIG. 1 illustrates a perspective view of a console drawer 1 corresponding to the information terminal device in accordance with the present invention. This console drawer 1 has an information-input device 4 having a display 2 and a keyboard 3, and a mouse 5 corresponding to the operation body in accordance with the present invention. The console drawer 1 may be mounted on a carriage 6 having a handle, and may be housed along a rail 7 with the display 2 being down as shown in FIG. 2. A description will be given of a schematic structure of the mouse 5 and the information-input device 4 composing the console drawer 1.

Figure 3A:
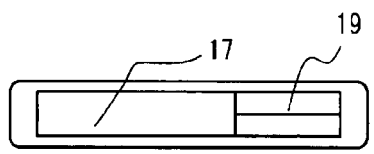
FIG. 3A through FIG. 3D illustrate an enlarged view of a mouse in accordance with an embodiment.
Figure 3B:
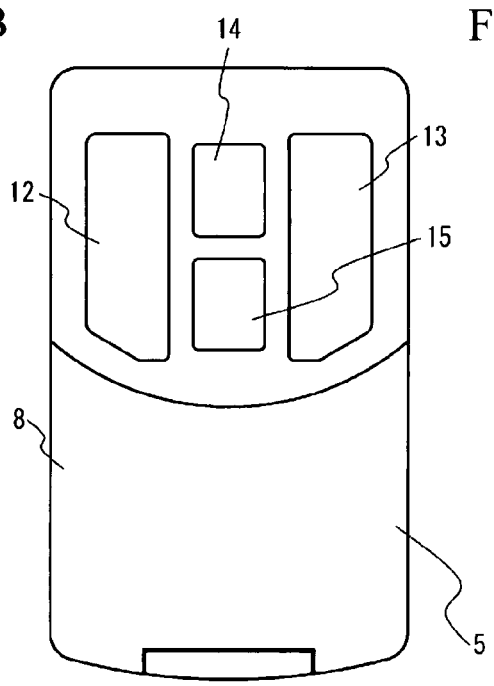
Figure 3D:
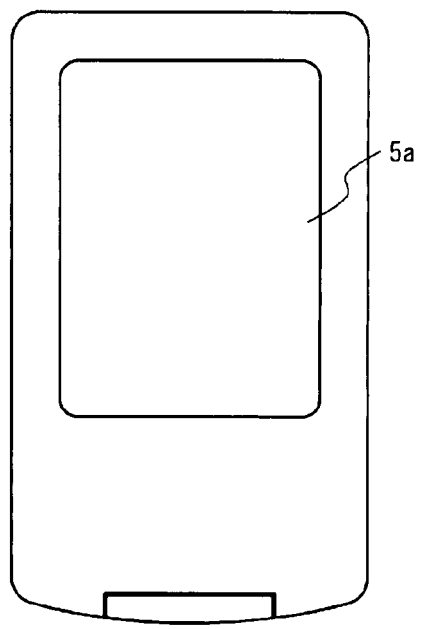
Figure 3C:
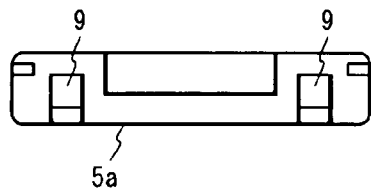
Figure 8:
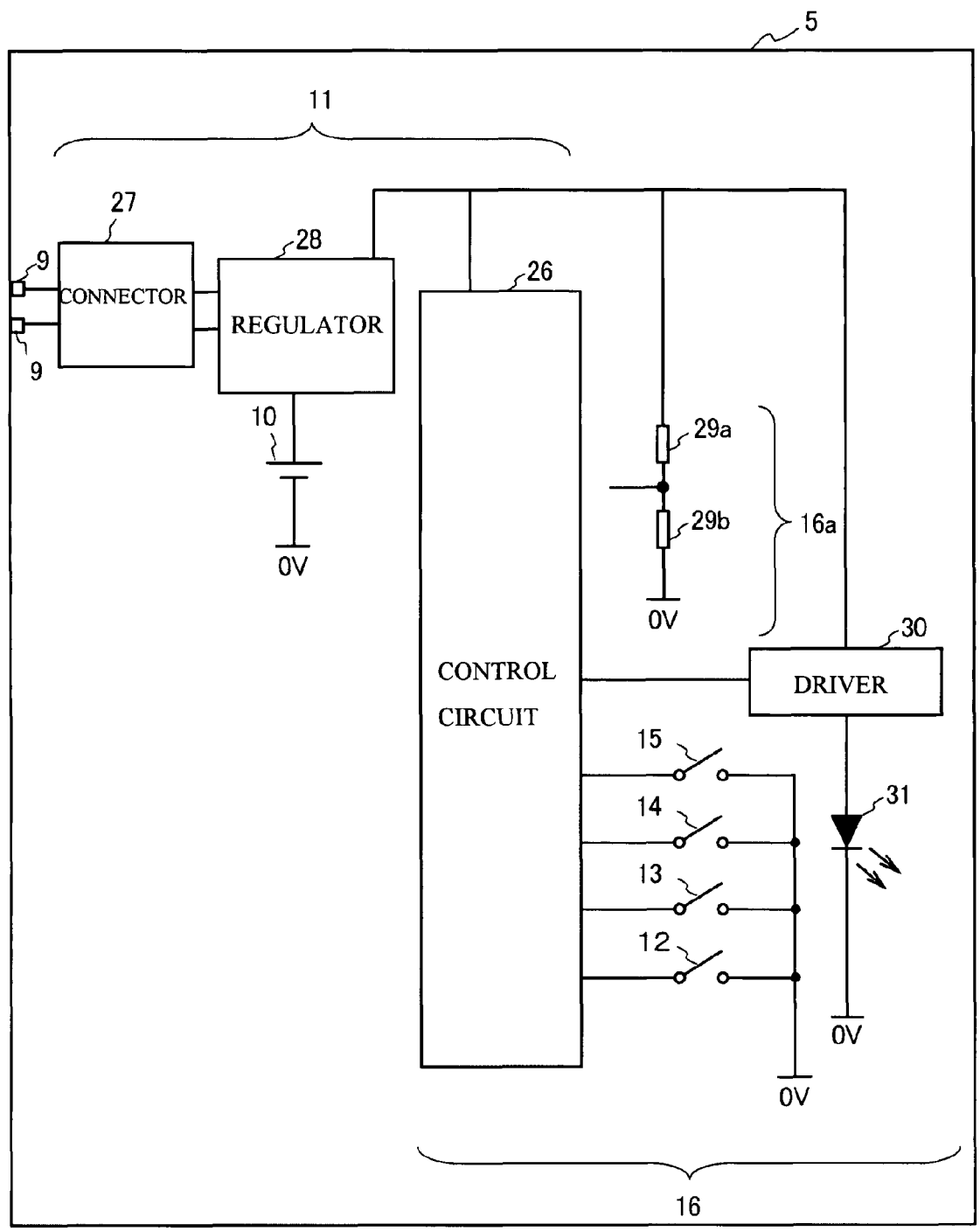
FIG. 8 illustrates a circuit diagram of a circuit housed in a mouse.

FIG. 3A illustrates a back view; FIG. 3B illustrates a top view; FIG. 3C illustrates a front view; and FIG. 3D illustrates a bottom view of the mouse 5. The mouse 5 has a pointing function for operating a pointer displayed on the display 2 of the information-input device 4. The mouse 5 has a chassis 8 having a bottom face as a reflection face 5a, and has a mouse side charge terminal 9 exposed from the chassis 8. The mouse 5 includes a lithium battery 10 corresponding to the second battery in accordance with the present invention. The mouse 5 further has a mouse side charge circuit 11 for charging the lithium battery 10 through the mouse side charge terminal 9 as shown in FIG. 8. Further, the mouse 5 has a left click button 12, a right click button 13, an upper scroll button 14, and a lower scroll button 15 outside. And the mouse 5 has an infrared radiation transmitter circuit (hereinafter, referred to as an IR transmitter circuit) 16 that transmits switch information cordlessly toward the information-input device 4 with an infrared radiation when these buttons are pushed. The mouse 5 has a window 17 transmitting the infrared radiation from the IR transmitter circuit 16. Further, there is provided a latching recess 19 at a lateral side of the window 17, the latching recess 19 engaging with a latching claw 18 corresponding to the lock member in accordance with the present invention, the latching claw 18 being provided at the side of the information-input device 4.

And, the IR transmitter circuit 16 (shown in FIG. 8) has a low-voltage detection circuit 16a that is built therein and detects whether a voltage of the lithium battery is low. The IR transmitter circuit 16 transmits information of the low-voltage condition detected by the low-voltage detection circuit 16a and the switch information.

On the other hand, the information-input device 4 has a chassis 20 supporting the keyboard 3. The chassis 20 houses a switch information processor 100 corresponding to the circuit cordlessly communicating with the operation body in accordance with the present invention, the mouse 5. The switch information processor 100 has an infrared receiver element 101 built therein. And the switch information processor 100 has a warning indicator that is built therein and indicates the low-voltage condition of the lithium battery 10 from the IR transmitter circuit 16. The infrared receiver element 101 and a warning indicator 102 are attached to a front face of the display 2 so as to be exposed.

Figure 11:
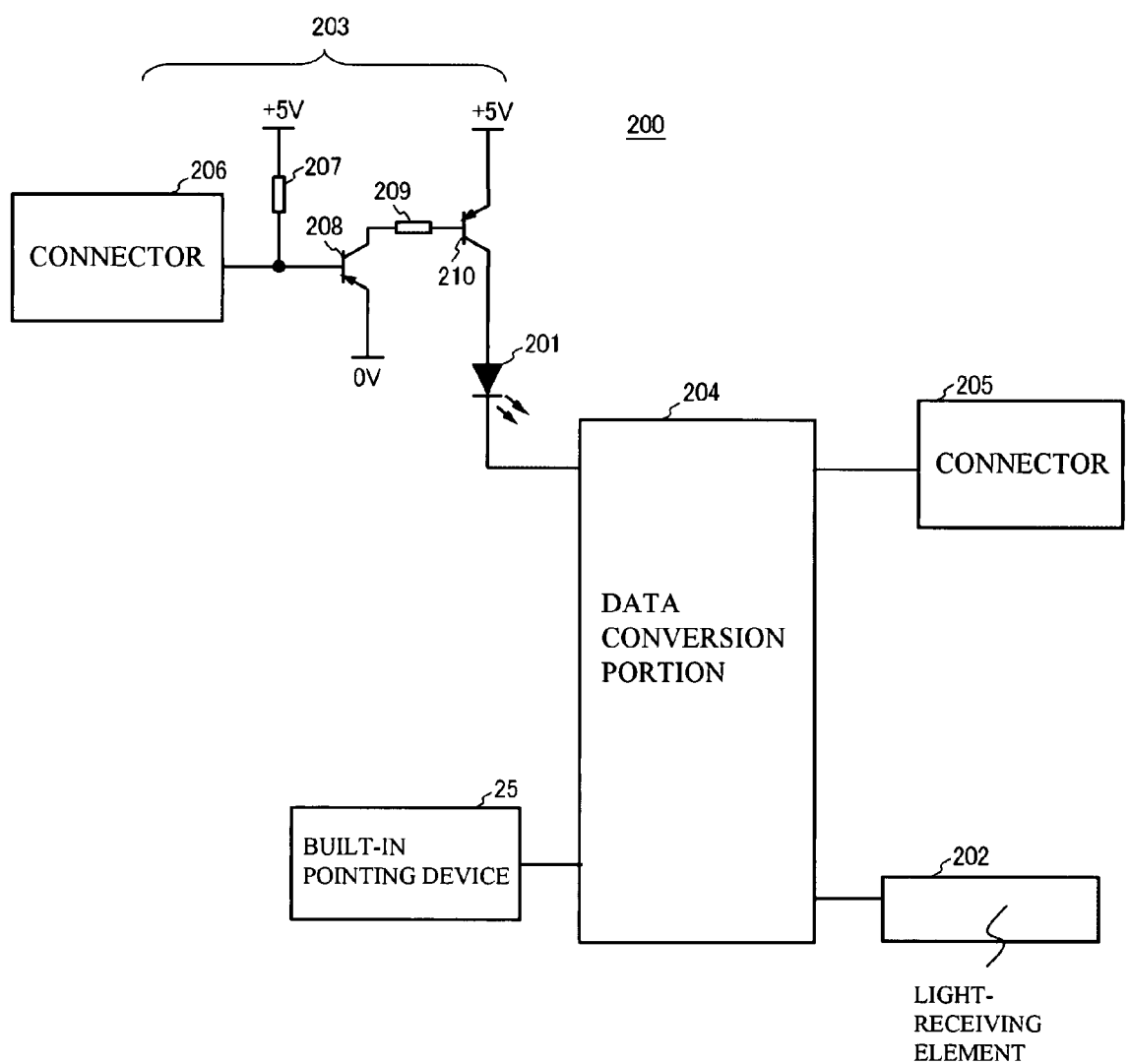
FIG. 11 illustrates a circuit diagram of a coordinate information processor.

A mouse operation space 20a is formed on an upper face of the chassis 20. The chassis 20 has a coordinate-information processor 200 therein that emits a light to the mouse 5 operated on a mouse operation space 20a through a transparent hole 20a1 provided on the mouse operation space 20a, receives a reflection light of the emitted light and corresponds to the optical system in accordance with the present invention. The coordinate-information processor 200 has a light-emitting element 201, a light-receiving element 202, and an emission stop circuit 203 built therein (FIG. 11).

Figure 4:
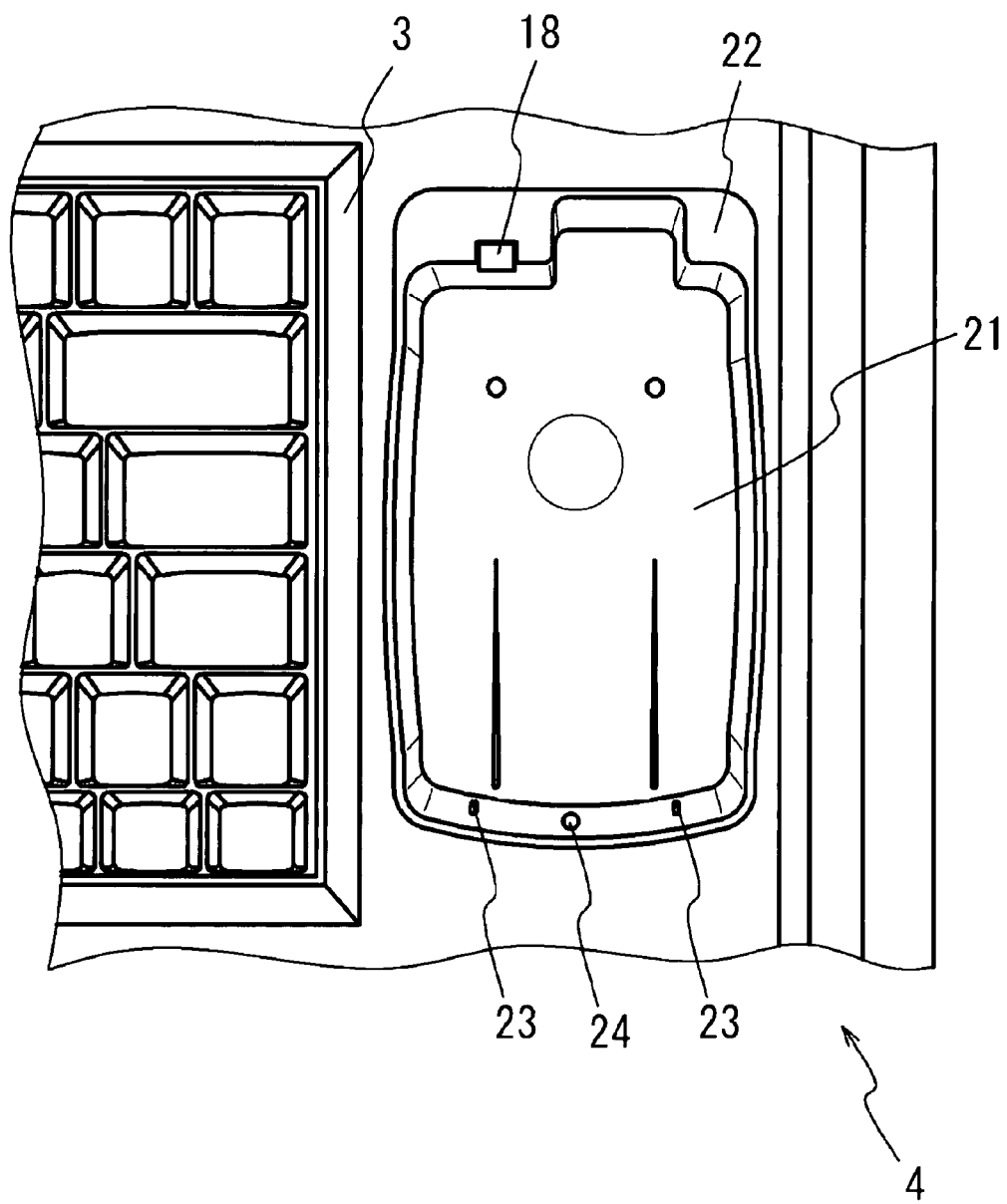
FIG. 4 illustrates a partly enlarged view around a recess housing a mouse.
Figure 5:
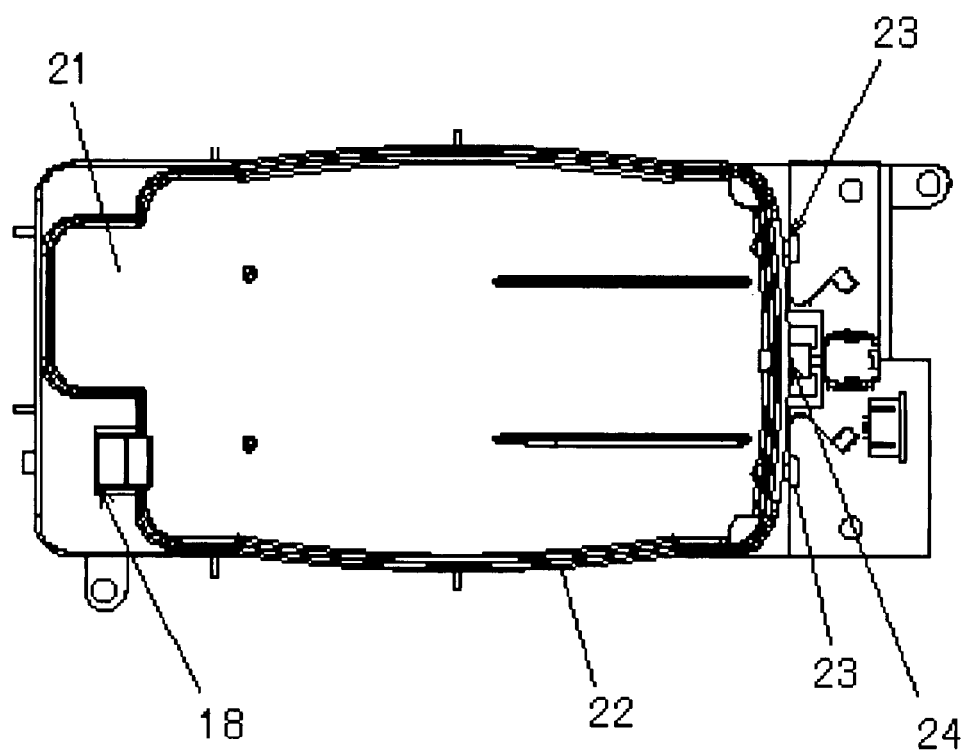
FIG. 5 illustrates a top view of a case forming a recess.

A recess 21 shown in FIG. 4 is formed in the chassis 20. The mouse 5 may be housed in the recess 21. Actually, a case 22 shown in FIG. 5 is fitted into the recess 21. The latching claw 18 is attached to the case 22 in the recess 21. The latching claw 18 corresponds to the lock mechanism in accordance with the present invention, is biased toward inside of the case with a spring not shown, is engaged with the latching recess 19 of the housed mouse 5, and locks up the mouse 5.

Figure 6:
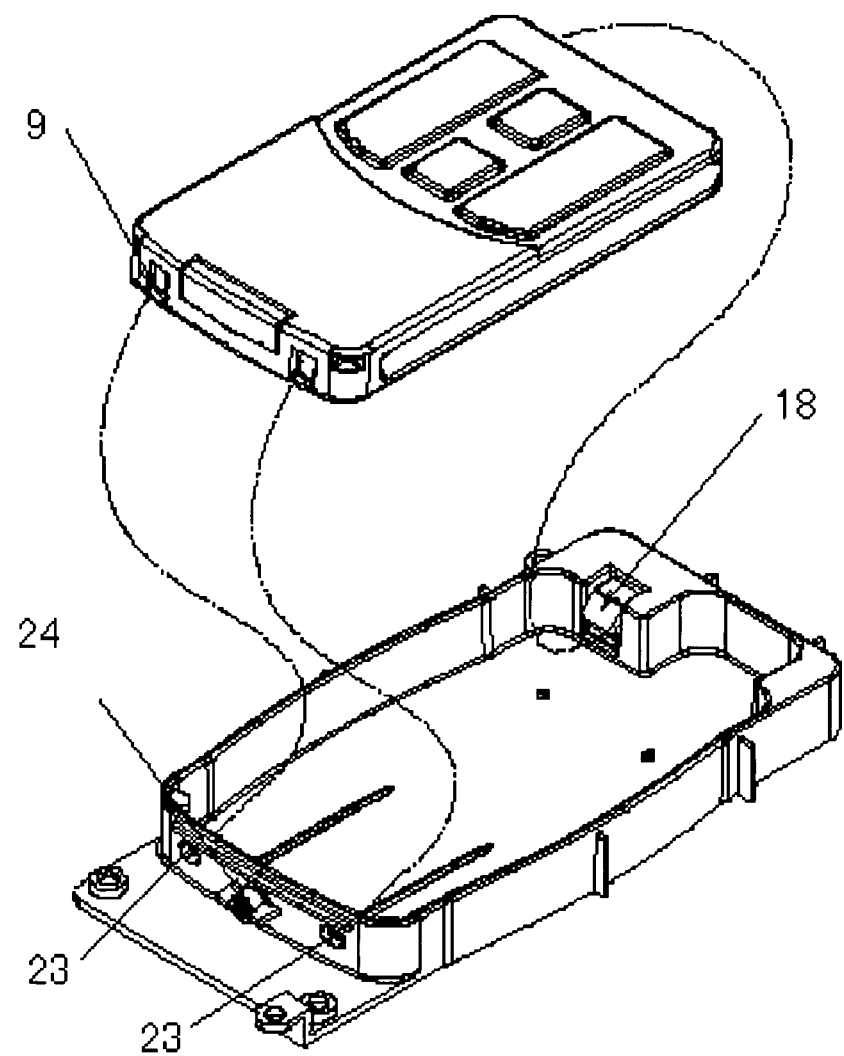
FIG. 6 illustrates an aspect where a mouse is housed in a recess.

An information-input device side charge terminal 23 and an emission stop button 24 built in the emission stop circuit 203 are attached to the case 22. The emission stop button 24 is attached to inside of the case 22 so as to be up and down. As shown in FIG. 6, a state is "ON" when the mouse 5 is housed in the case 22, the recess 21. This results in stopping the emission of the light-emitting element 201 in the coordinate information processor 200.

An operation button 25a of a built-in pointing device 25 corresponding to the operation portion in accordance with the present invention is attached to an upper face of the chassis 20. The built-in pointing device 25 is coupled to the coordinate information processor 200. It is therefore possible to operate a pointer without the mouse 5.

There is provided an information-input device side charge circuit 300 (shown in FIG. 12) receiving an electrical power from outside and being coupled to the information-input device side charge terminal 23, in the chassis 20 composing the information-input device 4. The information-input device side charge circuit 300 charges the lithium battery 10 of the mouse 5. The information-input device side charge circuit 300 has a diode 301 built therein that corresponds to the charging-state displaying mechanism and indicates that the lithium battery 10 is being charged.

And, the information-input device 4 has a communication circuit 400 (shown in FIG. 9) for communicating with an external server.

Figure 7:
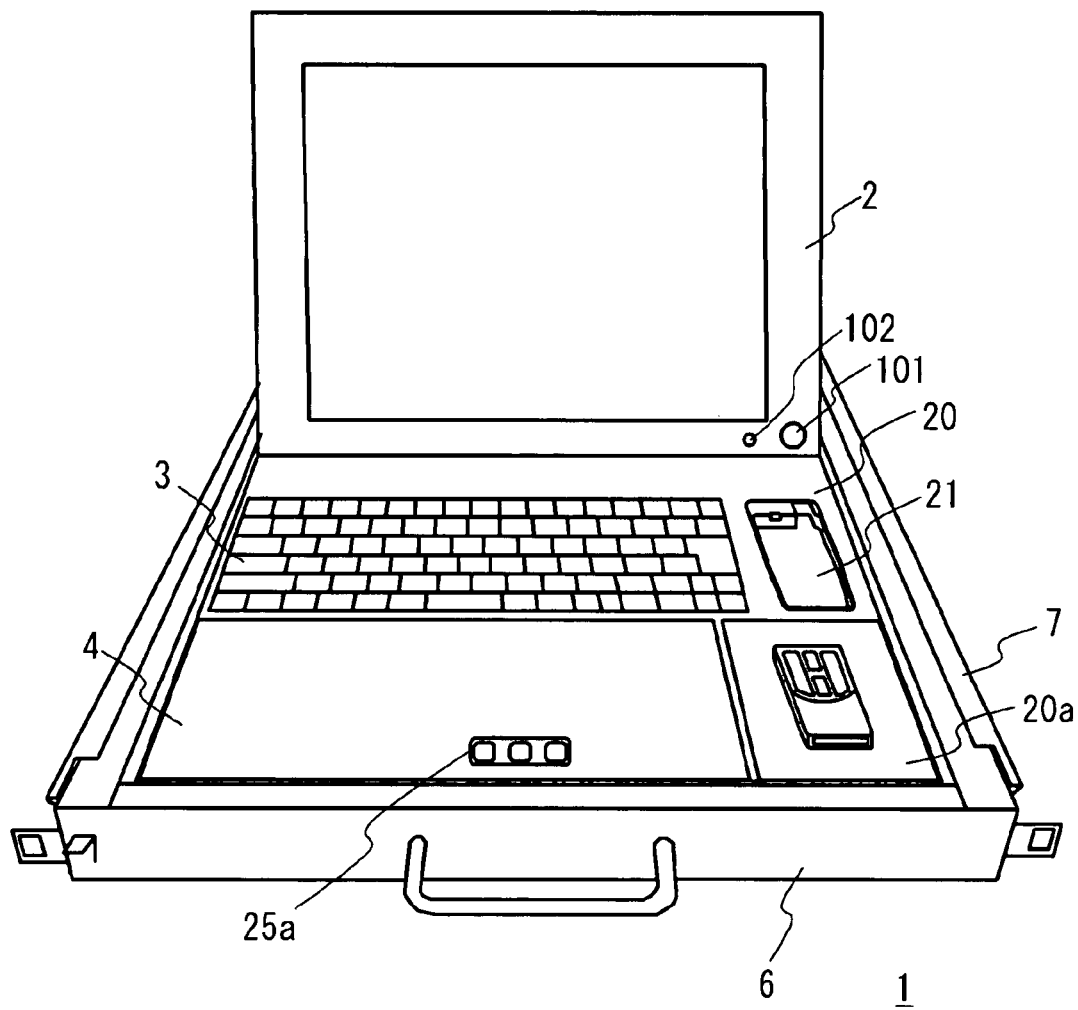
FIG. 7 illustrates an operation status in accordance with an embodiment.

The schematic structure of the mouse 5 and the information-input device 4 composing the console drawer 1 are described above. With the console drawer 1, it is possible to take out the mouse 5 from the recess 21 as shown in FIG. 7 and is possible to operate the pointer displayed on the display 2 by operating the mouse 5 on the operation space 20a.

Next, a description will be given of an operation of the mouse 5 and the information-input device 4 in addition to a structure of each circuit housed therein.

The mouse 5 houses the mouse side charge circuit 11 including a control circuit 26 shown in FIG. 8 and the IR transmitter circuit 16 including the control circuit 26. The mouse side charge circuit 11 has a connector 27 coupled to the mouse side charge terminal 9 and a regulator 28 coupled to the connector 27. The regulator 28 is coupled to the lithium battery 10. The lithium battery 10 is charged through the regulator 28 when the mouse 5 is housed in the recess 21 of the information-input device 4 and the mouse side charge terminal 9 contacts the information-input device side charge terminal 23.

And the regulator 28 is coupled to the IR transmitter circuit 16. The lithium battery 10 provides an electrical power to the IR transmitter circuit 16 through the regulator 28. The left click button 12, the right click button 13, the upper scroll button 14, and the lower scroll button 15 are built in the IR transmitter circuit 16 and are coupled to the control circuit 26. The control circuit 26 receives information concerning the push state of these buttons as the switch information.

The low-voltage detection circuit 16a is built in the IR transmitter circuit 16 as mentioned above. The low-voltage detection circuit 16a detects the voltage reduction of the lithium battery 10 as shown in FIG. 8, has two resistors 29a and 29b, and is coupled to the regulator 28 and the control circuit 26. The control circuit 26 detects the low-voltage state of the lithium battery 10 according to a voltage of a current passing through the regulator 28 and the resistor 29a.

An infrared emitter element 31 is coupled to the control circuit 26 through a driver 30. The infrared emitter element 31 is modulated by the driver 30 according to the switch information or the information concerning the low-voltage transmitted to the control circuit 26, and emits a light. The infrared radiation modulated according to the switch information or the information concerning the low-voltage is transmitted to the infrared receiver element 101 built in the switch information processor 100 in the information-input device 4.

Figure 9:
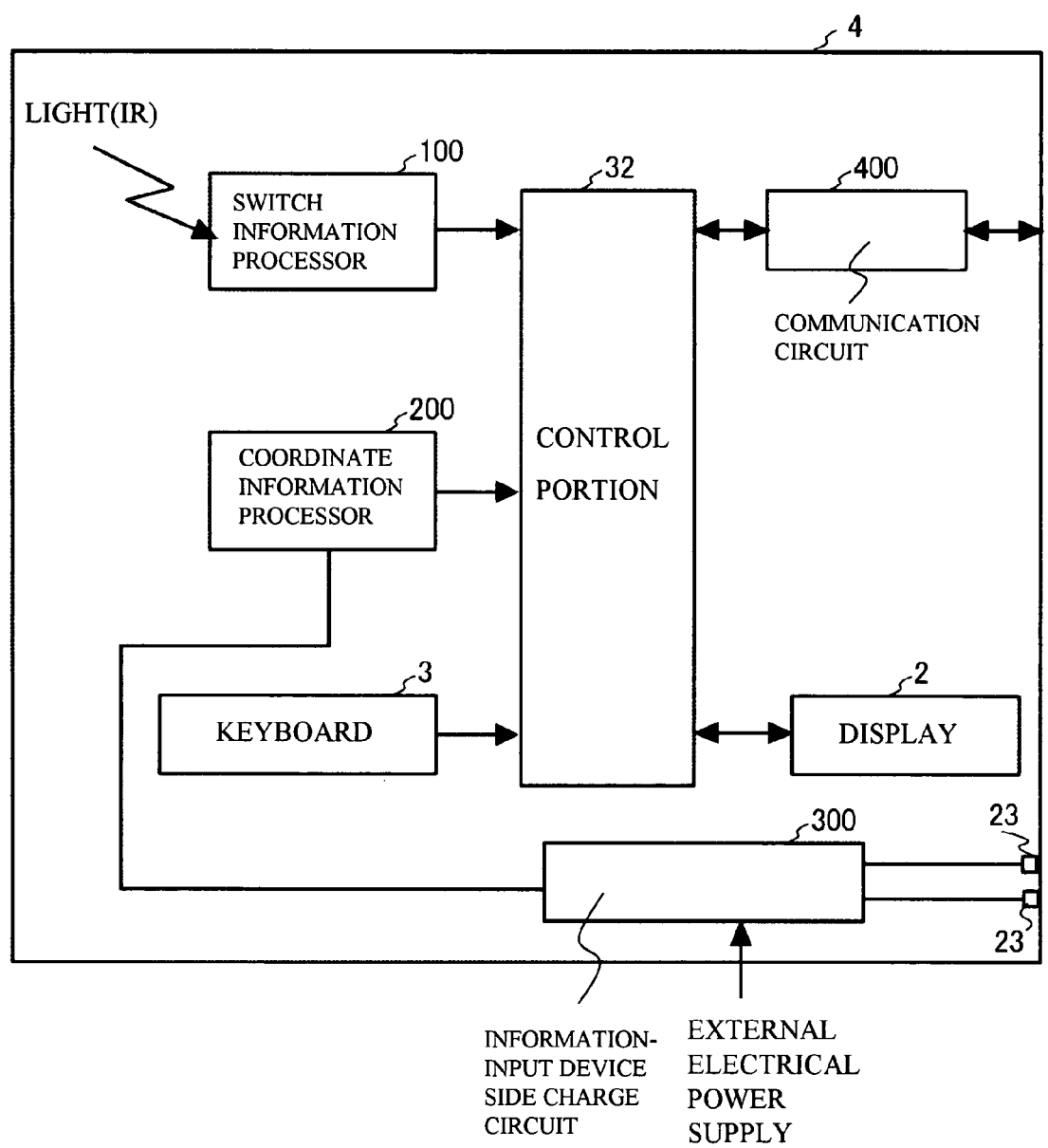
FIG. 9 illustrates a schematic structure of a circuit housed in an information-input device.

Next, a description will be given of a structure of a circuit housed in the information-input device 4. The circuit housed in the information-input device 4 has a circuit, in which the switch information processor 100, the coordinate information processor 200, the keyboard 3, the communication circuit 400 and the display 2 are coupled to a controller 32, and the information-input device side charge circuit 300, as shown in FIG. 9.

Figure 10:
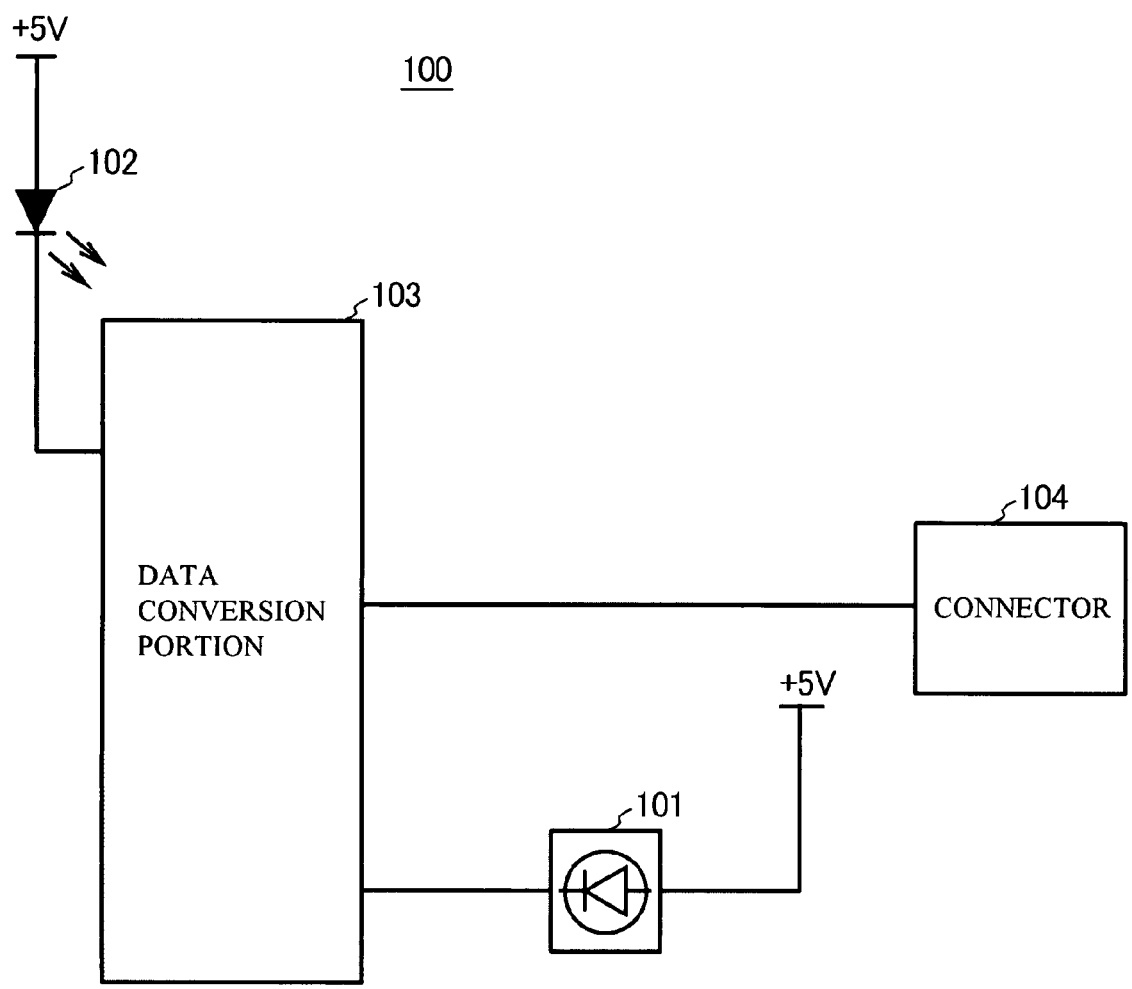
FIG. 10 illustrates a circuit diagram of a switch information processor.

The switch information processor 100 has a structure in which the infrared receiver element 101, the warning indicator 102 and a connector 104 are coupled to a data conversion portion 103, as shown in FIG. 10. The infrared receiver element 101 receives an infrared radiation emitted from the infrared emitter element 31 built in the mouse 5. The infrared radiation includes the switch information and the information concerning the low-voltage state of the lithium battery 10. The information is converted into a mouse data and a low-voltage instruction respectively in the data conversion portion 103. The data conversion portion 103 transmits the converted mouse data to the controller 32 through the connector 104. The data conversion portion 103 turns on the warning indicator 102 according to the low-voltage instruction. It is possible to confirm that the voltage of the lithium battery 10 is being reduced.

Next, a description will be given of a circuit in the coordinate information processor 200 with reference to FIG. 11. The coordinate information processor 200 has a structure in which the emission stop circuit 203 including the light-emitting element 201, the light-receiving element 202, the built-in pointing device 25 and a connector 205 are coupled to a data conversion portion 204. The light-emitting element 201 emits a light to the mouse 5 through the transparent hole 20a1. The light is reflected by the reflection face 5a of the mouse 5 and is received by the light-receiving element 202. A changing data of the reflected light received by the light-receiving element 202 is converted in the data conversion portion 204 and is transmitted to the controller 32 as the coordinate information of the pointer through the connector 205.

In addition, the coordinate information of the pointer is transmitted to the controller 32 from the built-in pointing device 25 through the data conversion portion 204 and the connector 205. The built-in pointing device 25 may transmit the switch information. That is, it is possible to perform the same operation as the mouse 5 without operating the mouse 5, by operating the operation button 25a.

Here, a description will be given of a structure and an operation of the emission stop circuit 203. The emission stop circuit 203 is coupled to the information-input device side charge circuit 300 shown in FIG. 12 through a connector 206. The emission stop circuit 203 has an electrical power supply of which 5V voltage is provided thereto through a resistor 207 shown in FIG. 11, a first transistor 208, and a second transistor 210 coupled to the first transistor 208 through a resistor 209. The light-emitting element 201 is coupled to the second transistor 210. In the emission stop circuit 203, a state of the first transistor 208 is "ON" because of the 5V voltage provided through the resistor 207 when a state of the emission stop button 24 of the information-input device side charge circuit 300 is "OFF". In this case, a state of the second transistor 210 is "ON". Accordingly, a current is provided to the light-emitting element 201 and the light-emitting element 201 emits a light.

On the other hand, when the state of the emission stop button 24 is "ON", the state of the first transistor 208 is "OFF" because a base of the first transistor 208 is grounded through the connector 206. In this case, the state of the second transistor 210 is "OFF". Accordingly, a current is not provided to the light-emitting element 201 and the light-emitting element 201 stops emitting a light.

The state of the emission stop button 24 is "ON" when the mouse 5 is housed in the recess 21. That is, the light-emitting element 201 stops emitting a light, when the mouse 5 is not operated.

Figure 12:
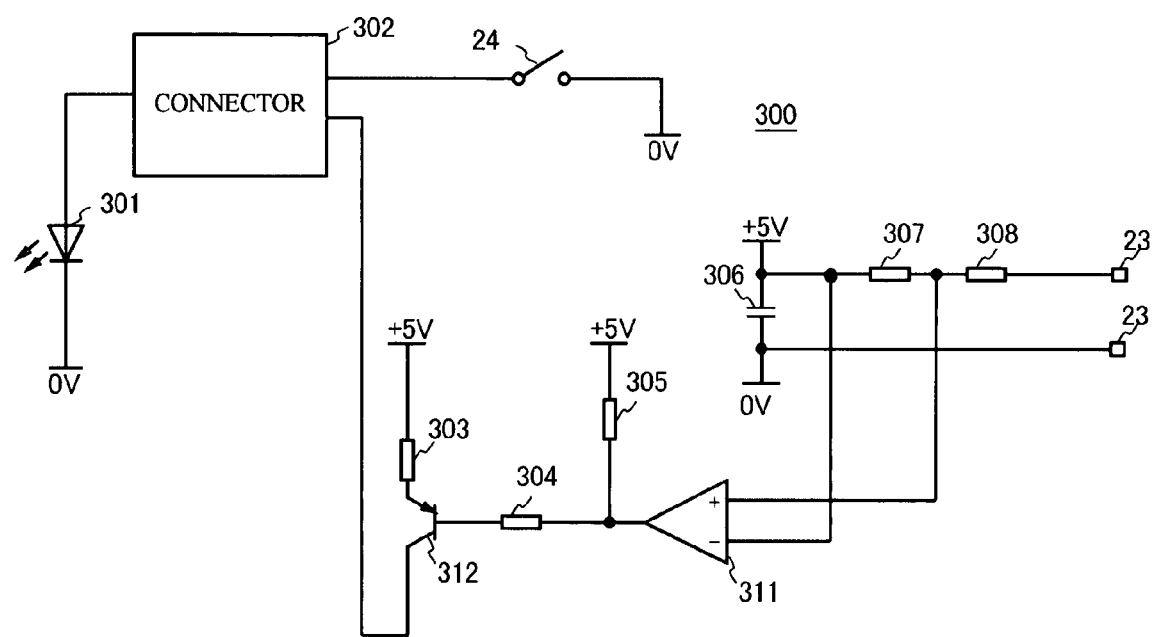
FIG. 12 illustrates a circuit diagram of an information-input device side charge circuit.
Figure 13:
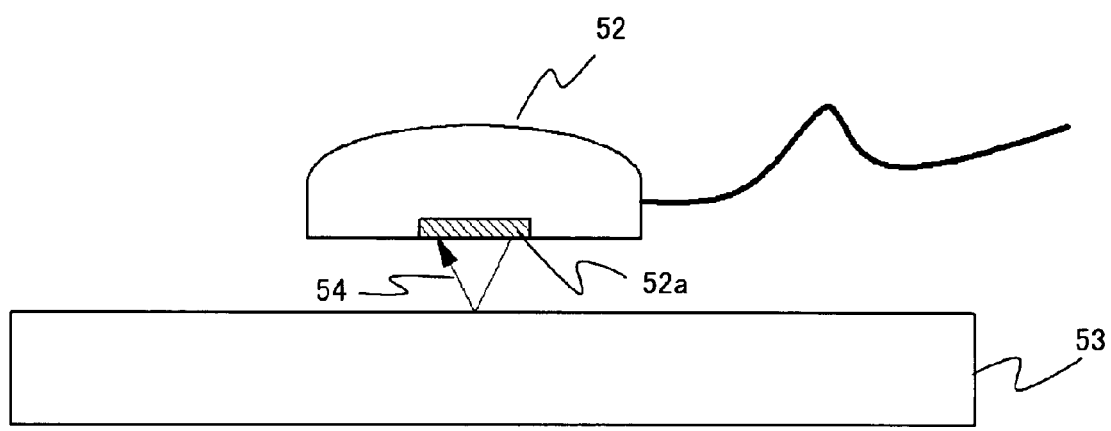
FIG. 13 illustrates a conventional optical mouse.
Figure 14:
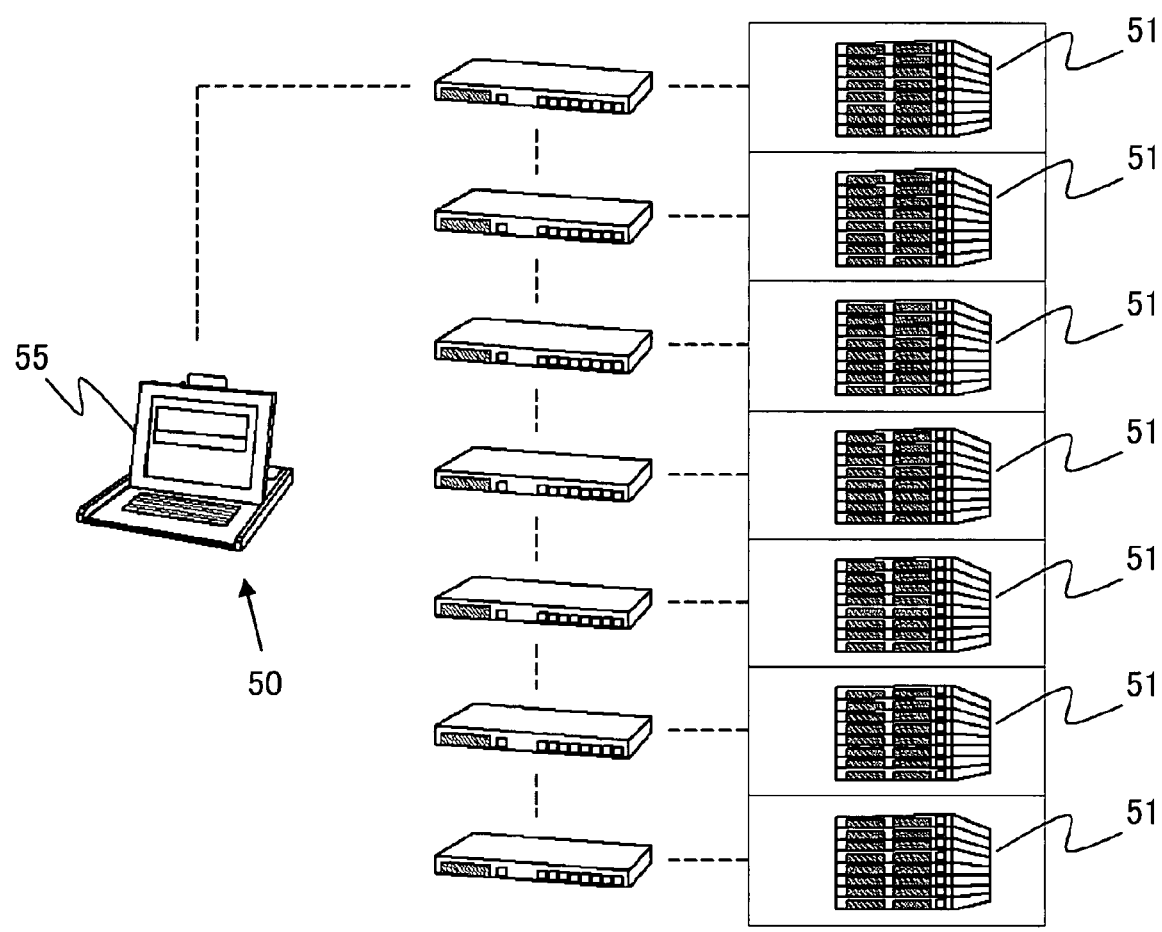
FIG. 14 illustrates a connection status of a console drawer.
Figure 15:
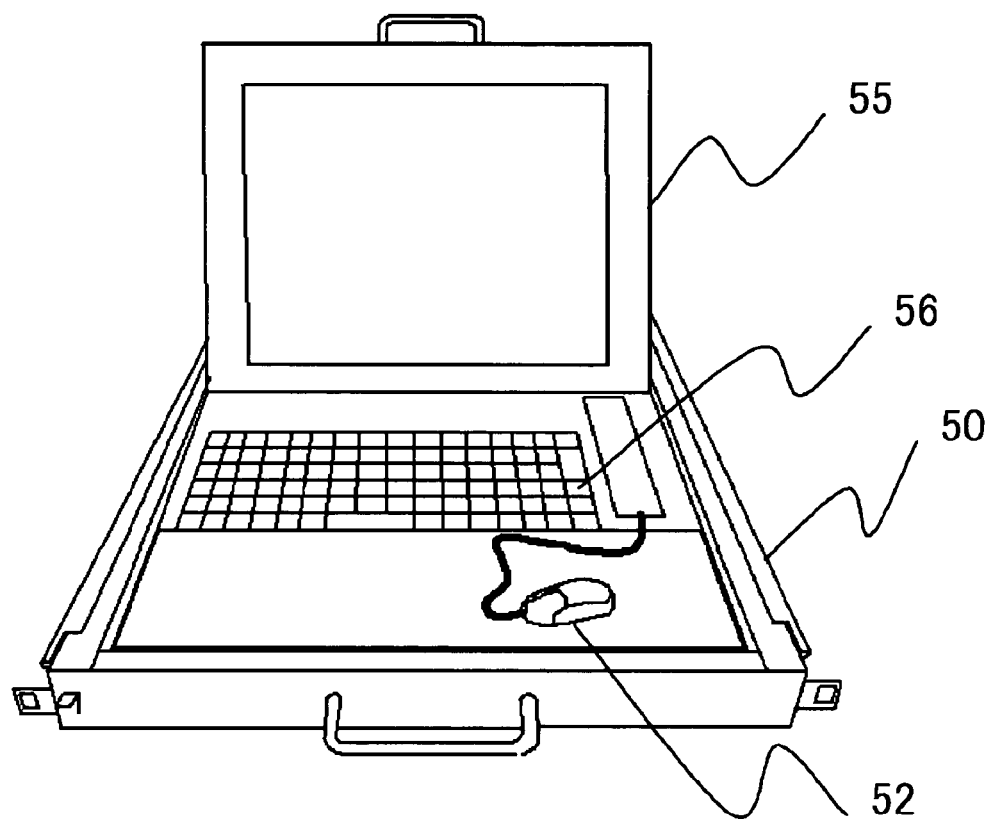
FIG. 15 illustrates a perspective view of a console drawer having a conventional mouse.
Figure 16:
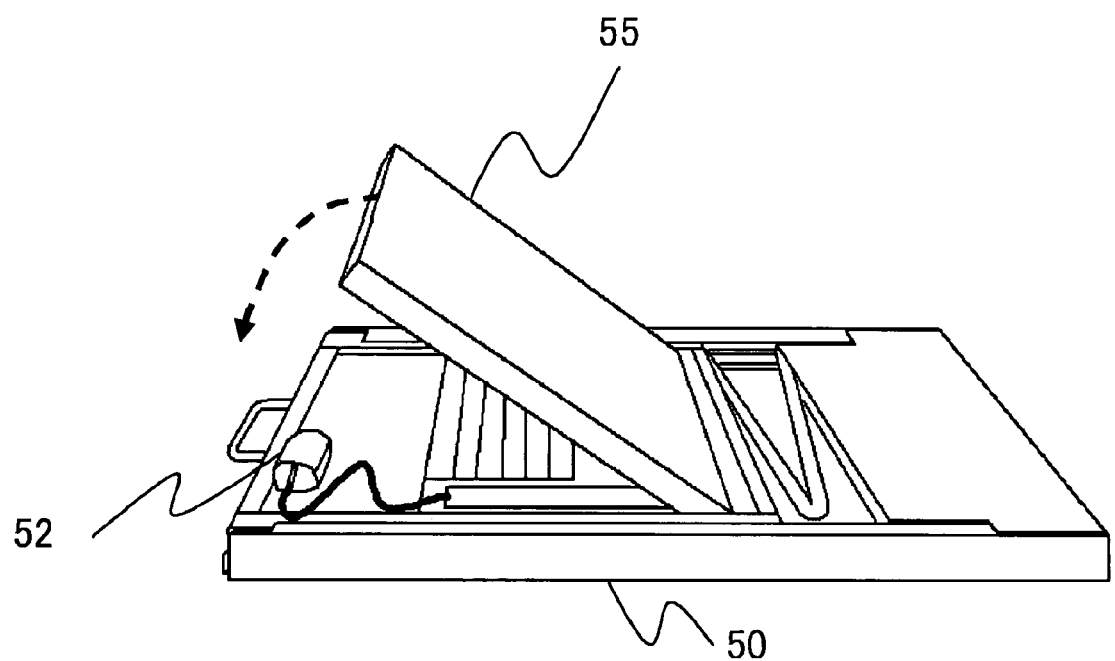
FIG. 16 illustrates an aspect where a mouse contacts a display in a drawer having a conventional mouse.

Next, a description will be given of the information-input device side charge circuit 300. The information-input device side charge circuit 300 has the light-emitting diode 301, a connector 302, resistors 303, 304, 305, 307 and 308, a condenser 306, a comparator 311 and a transistor 312, as shown in FIG. 12. In addition, the information-input device side charge circuit 300 has the information-input device side charge terminal 23. In the above-mentioned circuit, an electrical potential difference is generated between both sides of the resistor 307, because a charging current is provided to the resistor 307 when the information-input device side charge terminal 23 contacts the mouse side charge terminal 9 and the lithium battery 10 is charged. The comparator 311 detects the electrical potential difference, and accordingly a state of the transistor 312 is "ON". This results in that a current is provided to the light-emitting diode 301 through the transistor 312 from the electrical power supply, and accordingly the light-emitting diode 301 emits a light. When charging the lithium battery 10 is completed, a voltage at the both sides of the resistor 307 is zero or very small because no current or little current is provided to the resistor 307. This results in that an output of the comparator 311 is zero or approximately zero, and the state of the transistor 312 is "OFF". And the light-emitting diode 301 stops emitting a light. With the above-mentioned operation, the light-emitting diode 301 stops emitting a light when the lithium battery 10 is being charged, and stops emitting the light when the charge is completed.

It is evident that the above-mentioned embodiments are an example for carrying out the present invention, the present invention is not limited to these specific embodiments, but variations and modifications may be made within the scope of the claimed invention.

What is claimed is:

1. A console drawer, comprising:
    an operation body that has a pointing function with respect to information; and
    an information-input device that has a keyboard, a built-in pointing device with a pointing function with respect to information, a chassis supporting the keyboard and the built-in pointing device, an operation space for operation of the operation body, a closable display overlapping the chassis in a closed position, an optical system emitting light through a transparent hole provided on the operation space and receiving a reflected portion of the light from the operation body, and a data conversion portion converting data from the built-in pointing device into coordinate information,
    wherein the chassis has a recess to removably receive the operation body,
    the operation space is positioned adjacent to the recess at a surface of the chassis,
    the closable display covers the recess in the closed position,
    the recess has an emission stop button at an inside thereof movable between first and second positions, and
    wherein, when the operating body is received in the recess, the emission stop button is moved into the first position which stops the optical system from emitting light.

2. The console drawer as claimed in claim 1, wherein the recess has a lock mechanism to lock the housed operation body.

3. The console drawer as claimed in claim 1, wherein the operation body is surrounded only by the recess and the closable display in the closed position when being received in the recess.

* * * * *